US010850647B2

(12) United States Patent
Chang (10) Patent No.: US 10,850,647 B2
(45) Date of Patent: Dec. 1, 2020

(54) SEAT RECLINER FOR VEHICLE

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/381,258

(22) Filed: Apr. 11, 2019

(65) Prior Publication Data

US 2019/0337423 A1  Nov. 7, 2019

(30) Foreign Application Priority Data

May 2, 2018 (KR) ........................ 10-2018-0050424

(51) Int. Cl.
*B60N 2/20* (2006.01)
*B60N 2/22* (2006.01)
*B60N 2/235* (2006.01)
*B60N 2/68* (2006.01)

(52) U.S. Cl.
CPC ............. *B60N 2/20* (2013.01); *B60N 2/2227* (2013.01); *B60N 2/682* (2013.01); *B60Y 2304/05* (2013.01)

(58) Field of Classification Search
CPC ......... B60N 2/20; B60N 2/2227; B60N 2/682
USPC .......................................... 297/367 L, 367 P
See application file for complete search history.

(56) References Cited

U.S. PATENT DOCUMENTS

| 5,984,413 | A | 11/1999 | Baloche et al. |
| 7,648,204 | B2 | 1/2010 | Oki |
| 7,703,852 | B2 | 4/2010 | Wahls et al. |
| 8,038,218 | B2* | 10/2011 | Wahls ................ B60N 2/236 297/367 L |
| 8,042,872 | B2* | 10/2011 | Kim .................. B60N 2/236 297/367 L |
| 8,430,454 | B2* | 4/2013 | Tanguy ............... B60N 2/236 297/367 L |
| 8,523,281 | B2* | 9/2013 | Wahls ................ B60N 2/2356 297/367 L |

(Continued)

FOREIGN PATENT DOCUMENTS

| JP | 2009-072416 A | 4/2009 |
| JP | 2013-070856 A | 4/2013 |

(Continued)

OTHER PUBLICATIONS

Korean Office Action dated Jun. 11, 2019 from the corresponding Korean Application No. 10-2018-0050424, 6 pp.

(Continued)

*Primary Examiner* — Rodney B White
(74) *Attorney, Agent, or Firm* — Brinks Gilson & Lione (57) ABSTRACT

A seat recliner for a vehicle includes an insert part supporting a control part and coupled to an input member, thereby having improved assembly performance. The seat recliner further includes: a first flange on which a lock cam and lock gears are disposed, where the control part is disposed on upper parts of the lock gears and the lock cam; a second flange covering the control part and provided with a through hole; the input member penetrating through the first flange, the lock cam, the control part, and the second flange in order In particular, the insert part is inserted in the through hole and includes an inside surface, an outside surface, and a supporter.

9 Claims, 7 Drawing Sheets

(56) References Cited

U.S. PATENT DOCUMENTS

| | | | |
|---|---|---|---|
| 8,720,999 B2* | 5/2014 | Peters | B60N 2/236 |
| | | | 297/367 L |
| 8,864,234 B2* | 10/2014 | McCulloch | B60N 2/2358 |
| | | | 297/367 P |
| 8,955,910 B2* | 2/2015 | Line | B60N 2/2245 |
| | | | 297/367 L |
| 9,296,315 B2 | 3/2016 | Hellrung | |
| 10,093,201 B2* | 10/2018 | Auer | B60N 2/2356 |
| 2012/0169105 A1* | 7/2012 | Assmann | B60N 2/236 |
| | | | 297/367 P |
| 2012/0205956 A1* | 8/2012 | Nock | B60N 2/20 |
| | | | 297/362 |
| 2013/0001997 A1* | 1/2013 | Gallienne | B60N 2/682 |
| | | | 297/354.12 |
| 2013/0320735 A1 | 12/2013 | McCulloch et al. | |
| 2014/0110984 A1 | 4/2014 | Assmann et al. | |
| 2014/0132053 A1* | 5/2014 | Schuler | B60N 2/2356 |
| | | | 297/367 P |
| 2014/0239691 A1 | 8/2014 | Hellrung | |
| 2014/0239693 A1* | 8/2014 | Nock | B60N 2/2252 |
| | | | 297/361.1 |
| 2015/0008715 A1 | 1/2015 | Hur et al. | |
| 2015/0069809 A1 | 3/2015 | Matt | |
| 2015/0084392 A1* | 3/2015 | Chang | B60N 2/236 |
| | | | 297/367 P |
| 2015/0321585 A1 | 11/2015 | McCulloch et al. | |
| 2016/0023578 A1* | 1/2016 | Tame | B60N 2/2356 |
| | | | 297/354.12 |
| 2017/0341539 A1* | 11/2017 | Chang | B60N 2/2251 |
| 2017/0361736 A1* | 12/2017 | Chang | B60N 2/2362 |

FOREIGN PATENT DOCUMENTS

| | | |
|---|---|---|
| KR | 10-2009-0099568 A | 9/2009 |
| KR | 10-2013-0054443 A | 5/2013 |
| KR | 10-2014-0001651 | 1/2014 |
| KR | 10-1453077 B1 | 10/2014 |
| KR | 10-1690041 B1 | 12/2016 |
| KR | 10-1725412 | 4/2017 |
| KR | 10-1746455 B1 | 6/2017 |
| KR | 10-1787990 B1 | 10/2017 |
| WO | 2012/038020 A1 | 3/2012 |

OTHER PUBLICATIONS

Korean Office Action dated May 28, 2019 from the corresponding Korean Application No. 10-2018-0050422, 7 pp.
Korean Office Action dated May 30, 2019 from the corresponding Korean Application No. 10-2018-0050423, 6 pp.
Korean Notice of Allowance dated Apr. 24, 2020 from the corresponding Korean Application No. 10-2018-0050422, 2 pp.
U.S. Office Action dated Jul. 15, 2020 from the corresponding U.S. Appl. No. 16/381,211, 16 pp.

* cited by examiner

SEAT RECLINER FOR VEHICLE

CROSS REFERENCE TO RELATED APPLICATION

The present application claims priority to and the benefit of Korean Patent Application No. 10-2018-0050424, filed May 2, 2018, the entire contents of which are incorporated herein by reference.

FIELD

The present disclosure relates generally to a seat recliner for a vehicle.

BACKGROUND

The statements in this section merely provide background information related to the present disclosure and may not constitute prior art.

Generally, a seat of a vehicle is comprised of a seat back supporting a passenger's upper body, a seat cushion supporting a passenger's lower body, namely the buttocks and thighs, and a head rest supporting a passenger's rear head, and a reclining device which is provided at a portion where the seat back and the seat cushion are connected to each other to enable adjustment of an angle of the seat back relative to the seat cushion.

In general, the reclining device has two types: a manual type reclining device that adjusts the angle of the seat back by manually controlling a lever by a passenger, and a power type reclining device that is operated using power of a motor operated by switch control. Regardless of the operation methods, only reclining devices having strong coupling between parts of the reclining device during reclining can provide a comfort for the passenger and ensure safety in a vehicle collision.

This seat recliner is generally configured such that a first flange is fixed, and a second flange is relatively rotated, with a lock gear provided in the recliner. When the lock gear is engaged with the second flange, the recliner is locked, and when the lock gear is released, the second flange is relatively rotated on the first flange so that the seat back is available to be reclined on the basis of the seat cushion.

Figure 1:
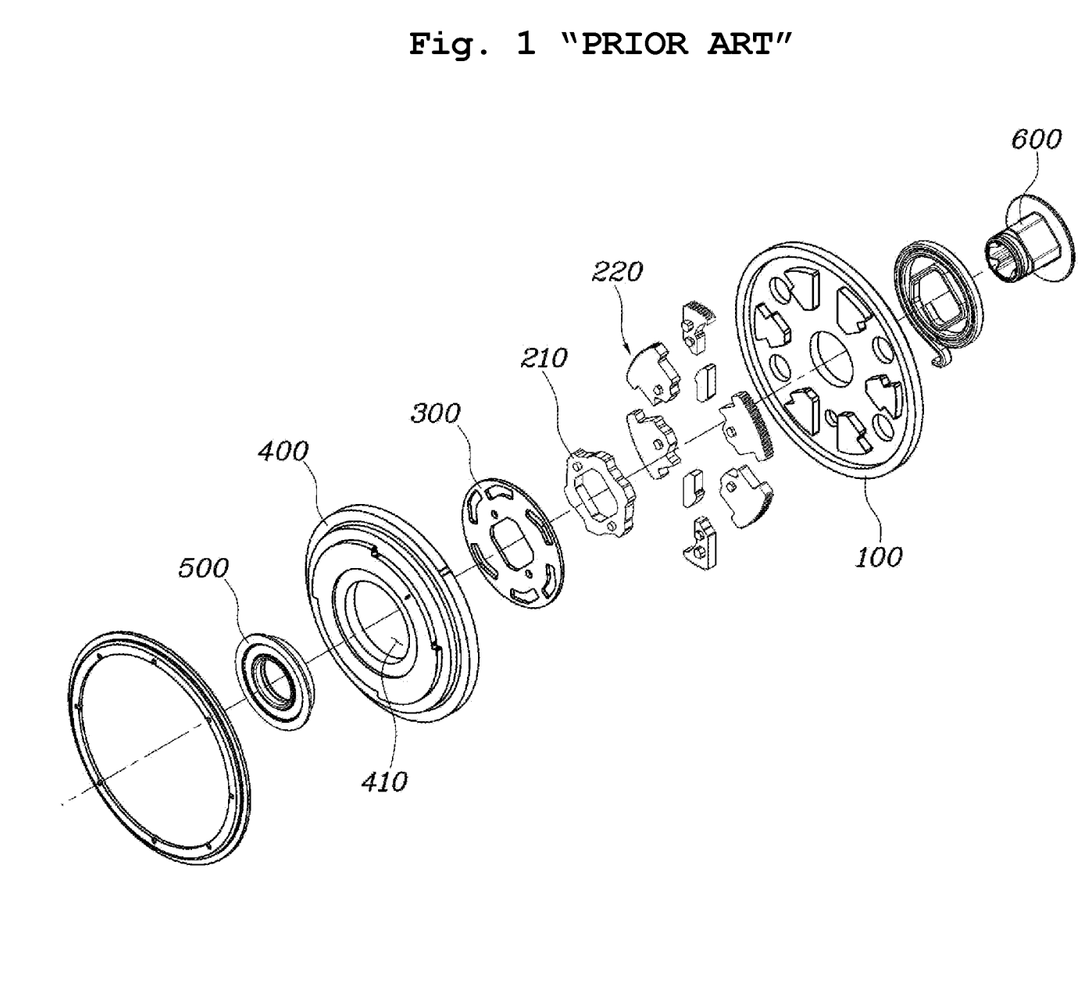
FIG. 1 is an exploded perspective view showing a seat recliner for a vehicle according to the related art.
Figure 2:
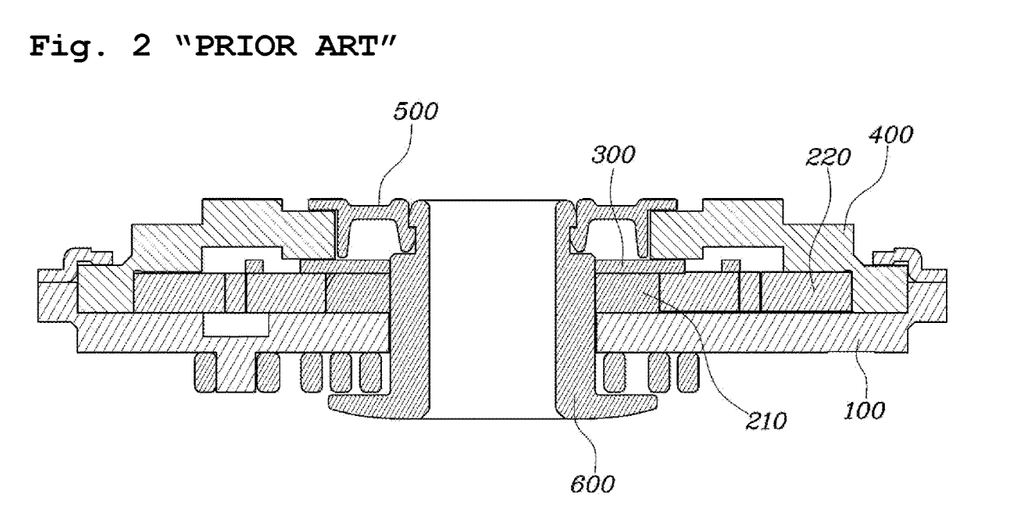
FIG. 2 is a cross-sectional view showing the seat recliner for the vehicle according to the related art.

FIG. 1 is an exploded perspective view showing a seat recliner for a vehicle according to the related art. FIG. 2 is a cross-sectional view showing the seat recliner for the vehicle according to the related art.

Referring to FIGS. 1 and 2, in a seat recliner according to the related art, a lock cam 210 and a lock gear 220 are seated on an upper part of a first flange 100, a control part 300 is disposed on upper parts of the lock cam 210 and the lock gear 220, and a second flange 400 covers over the control part.

A cap 500 is engaged with an end of an input member 600 penetrating through the second flange 400 at the outside of the second flange 400. Therefore, at a first side of the recliner, the input member 600 engaged with a spring (not shown) is inserted in the second flange, and at the other side (i.e. a side of the second flange 400), the cap 500 is engaged to finish assembly.

The input member 600 is engaged with the cap 500 using a locking structure, so the input member 600 cannot be easily engaged with and separated from the cap 500. In this process, the cap 500 may be deformed, and the cap 500 is molded by injecting a plastic material, so the deformation of the cap 500 is partially allowed and the cap is easily engaged with the second flange. However, We have discovered that this cap 500 has problems that the cap 500 may be damaged due to the deformation during assembling, and after assembly, may be damaged in processes such as welding.

The foregoing is intended merely to aid in the understanding of the background of the present disclosure, and is not intended to mean that the present disclosure falls within the purview of the related art that is already known to those skilled in the art.

SUMMARY

The present disclosure proposes a seat recliner for a vehicle, which includes an insert part made of a metal material, supporting a control part exposed through a through hole provided on a second flange, and coupled to an input member inserted in the through hole, thereby having improved assembly performance.

In one aspect of the present disclosure, a seat recliner for a vehicle includes: a first flange on which a lock cam is seated at a center part thereof to be rotatable; and a plurality of lock gears radially disposed around the lock cam; a control part disposed on upper parts of the lock gears and the lock cam, and configured to guide the lock gears so that the lock gears slide inward and outward; a second flange covering the control part and coupled to be rotatable relative to the first flange, and provided with a through hole at a center part thereof to expose a center part of the control part to outside; an input member extended along a central axis of each of the first flange and the second flange, and configured to penetrate through the first flange, the lock cam, the control part, and the second flange in order, wherein an end part of the input member is exposed to outside of the second flange; and an insert part inserted in the through hole of the second flange. In particular, of the insert part may include: an inside surface locked to an outer circumferential surface of the exposed end part of the input member, an outside surface supported by an inner circumferential surface of the second flange which defines the through hole, and a supporter configured to connect the inside surface and the outside surface of the insert part, and configured to support an exposed upper surface of the control part.

The inside surface of the insert part may have a cone shape inclined toward an upper side of the second flange to be tapered in an inside direction of the through hole of second flange.

An upper end of the inside surface of the insert part may have an inner diameter provided larger than an outer diameter of the outer circumferential surface of the input member, so the insert part is forcibly fitted around the input member.

The inside surface of the insert part may be extended so that a plane distance from an end of the supporter connected to the outside surface to an upper end of the inside surface may be larger than a plane distance from the inner circumferential surface of the second flange to the outer circumferential surface of the input member, so the insert part may be forcibly fitted around the input member.

The inside surface of the insert part may be provided with a plurality of slits formed along a radial direction of the insert part, such that the inside surface may be divided into a plurality of parts.

The outside surface of the insert part may have a flange shape configured such that an upper end of the outside surface is vent out of the through hole on an upper end of the inner circumferential surface of the second flange.

The supporter of the insert part may be a ring shape plate and be placed on the upper surface of the control part exposed to the outside through the through hole.

The supporter of the insert part may be in close contact with the upper surface of the control part.

The outer circumferential surface of the input member may have a stopping step for being locked to the insert part so that the end of the inside surface of the insert part may be inhibited or prevented from being separated from the input member.

A plurality of stopping steps provided on the outer circumferential surface of the input member may be disposed along a central axis of the input member.

According to the present disclosure, by using the insert part made of the metal material by the press method, production cost of the seat recliner of the present disclosure can be reduced than a case of using the cap configured of the plastic material by injection molding.

In addition, assembly performance and coupling of the seat recliner can be improved by elasticity of the insert part.

In addition, the seat recliner of the present disclosure can have heat resistance and rigidity enough to endure heat during welding after assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be embodied in many different forms without departing from the spirit and significant characteristics of the present disclosure. Therefore, the forms of the present disclosure are disclosed only for illustrative purposes and should not be construed as limiting the present disclosure.

Reference will now be made in detail to various forms of the present disclosure, specific examples of which are illustrated in the accompanying drawings and described below, since the forms of the present disclosure can be variously modified in many different forms. While the present disclosure will be described in conjunction with exemplary forms thereof, it is to be understood that the present description is not intended to limit the present disclosure to those exemplary forms. On the contrary, the present disclosure is intended to cover not only the exemplary forms, but also various alternatives, modifications, equivalents and other forms that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary forms of the present disclosure will be described in detail with reference to the accompanying drawings. Throughout the drawings, the same reference numerals will refer to the same or like parts.

Figure 3:
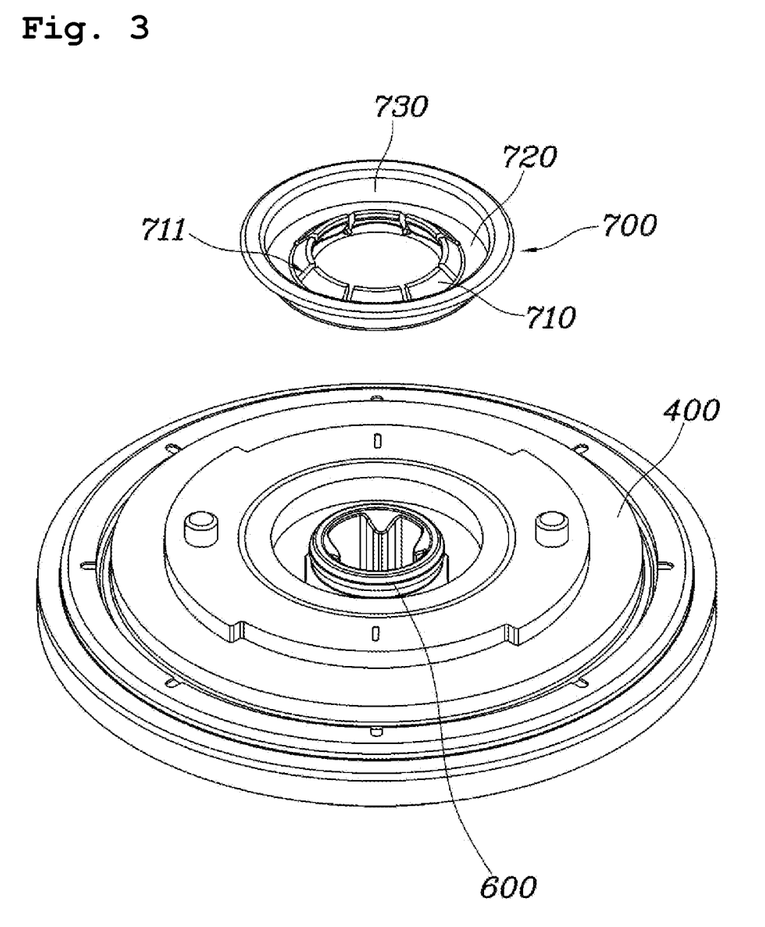
FIG. 3 is an exploded perspective view showing a seat recliner of the vehicle according to one form of the present disclosure.
Figure 4:
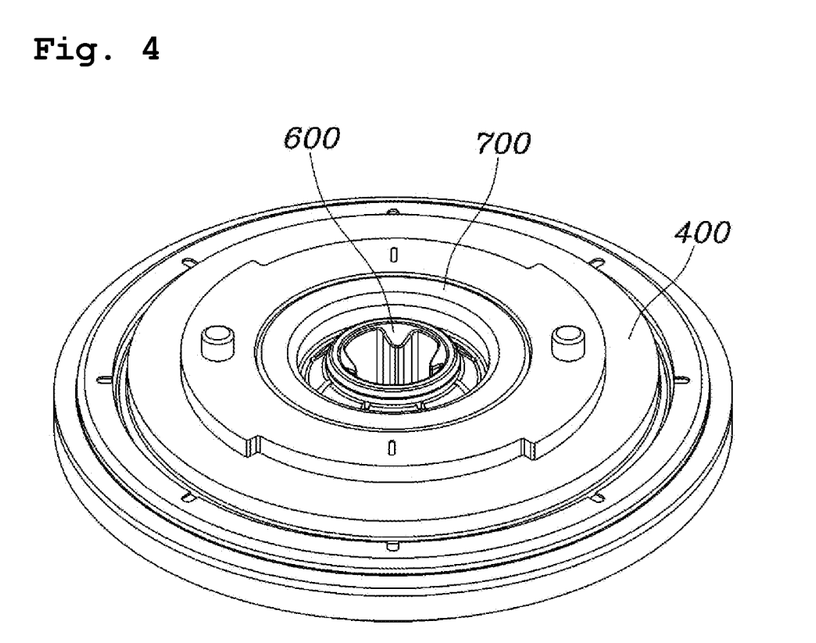
FIG. 4 is a view showing the seat recliner of the vehicle to be assembled according to one form of the present disclosure.
Figure 5:
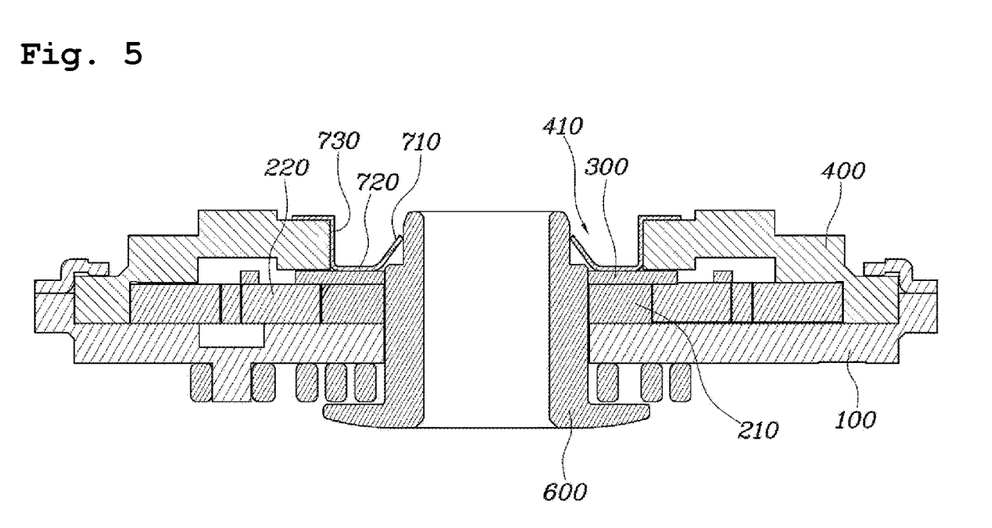
FIG. 5 is a cross-sectional view showing the seat recliner of the vehicle according to one form of the present disclosure.

FIG. 3 is an exploded perspective view showing a seat recliner of the vehicle according to one form of the present disclosure. FIG. 4 is a view showing the seat recliner of the vehicle to be assembled according to the form of the present disclosure. FIG. 5 is a cross-sectional view showing the seat recliner of the vehicle according to the form of the present disclosure.

Referring to FIGS. 3 to 5, the seat recliner for the vehicle includes: a first flange 100 on which a lock cam 210 is seated at a center part thereof to be rotatable and a plurality of lock gears 220 is radially disposed around the lock cam 210; a control part 300 disposed on upper parts of the lock gears 220 and the lock cam 210, guiding the lock gears 220 to slide inward and outward; a second flange 400 covering the control part 300 and coupled to be rotatable relative to the first flange 100, and provided with a through hole 410 at a center part thereof to expose a center part of the control part 300 to the outside; an input member 600 extended along a central axis of the first flange 100 and the second flange 400, penetrating through the first flange 100, the lock cam 210, the control part 300, and the second flange 400 in order, then exposing an end part thereof to outside of the second flange 400; and an insert part 700 inserted from the top of the second flange 400 into the through hole 410 of the second flange 400. In particular, of the insert part includes: an inside surface 710 locked to an outer circumferential surface of the exposed end part of the input member 600, an outside surface 730 supported by an inner circumferential side of the second flange 400 which defines the through hole 410, and a supporter 720 connecting the inside surface 710 and the outside surface 730 and supporting an exposed upper surface of the control part 300.

The first flange 100 is provided with a plurality of guide parts protruding and spaced apart in a circumferential direction of the first flange 100, and a guide space is provided between each of guide parts. The lock gear 220 is disposed on each of guide spaces.

The lock cam 210 is disposed at the center part of the first flange 100, and the lock gears 220 are disposed around an outer circumferential surface of the lock cam 210. The lock cam 210 compresses the plurality of lock gears 220 so that the lock gears slide outward, and when the lock cam 210 is rotated, the lock gears 220 slide inward.

The lock gear 220 is disposed on each guide space of the first flange 100, and a lower surface of the lock gear is seated on the guide space such that the lock gear 220 slides inward and outward along the guide part. The lock gear 220 is provided with outer teeth at an outer end thereof. As the lock gear 220 slides inward and outward, the outer teeth of the lock gear 220 may be engaged with or separated from inner teeth provided at an inner end of the second flange 400 that will be described later herein. When the outer teeth of the lock gear 220 is engaged with the inner teeth of the second flange 400, relative rotation between the first flange 100 and the second flange 400 is locked so that a seat back and a seat cushion can be maintain at a desired angle.

On the contrary, when the lock gear 220 slides inward to release teeth engagement of the outer teeth of the lock gear 220 and the inner teeth of the second flange 400, the first flange 100 and the second flange 400 may be rotated relative to each other, so that the angle between seat back and the seat cushion can be adjusted.

Particularly, a guide protrusion is provided on an upper surface of the lock gear 220, the guide protrusion of the lock gear 220 is inserted into a guide slit of the control part 300. Accordingly, when the control part 300 is rotated, the guide protrusion of the lock gear 220 moves along the guide slit and the lock gear 220 slides inward, thus the teeth engagement between the lock gear and the second flange 400 is released. In this case, as a locked state between the first flange 100 and the second flange 400 is released, the seat back and the seat cushion are in a state in which the relative angle therebetween is adjusted.

The control part 300 is disposed on the upper surfaces of the plurality of lock gears 220 and the lock cam 210, and covers the upper surfaces thereof. The control part 300 is provided with the guide slit, in which the guide protrusion of the lock gear 220 is inserted, guiding the guide protrusion along a route as the control part 300 is rotated.

The second flange 400 covers an upper part of the control part 300 and is coupled to be rotatable relative to the first flange 100. A retainer may finish coupling between the first flange 100 and the second flange 400 at an upper part of the second flange 400. The through hole 410 is provided at the center part of the second flange 400 to expose the center part of the control part 300.

The input member 600 is extended along a central axis of the first flange 100 and the second flange 400. The input member 600 penetrates through the first flange 100, the lock cam 210, the control part 300, and the second flange 400 in order, then an end part thereof is exposed to the outside of the second flange 400. The input member 600 is coupled to the lock cam 210 and the control part 300 so as to be rotated along with the lock cam 210 and the control part 300, but is coupled to the first flange 100 so as to be rotated relative thereto.

The insert part 700 covers an exposed central upper part of the control part 300, and is inserted into the through hole 410 of the second flange 400 from the top. The insert part 700 has a push-nut type shape, so, it is locked to the outer circumferential surface of the exposed end part of the input member 600 in the through hole 410 of the second flange 400.

Specifically, the insert part 700 is comprised of the inside surface 710 locked to the outer circumferential surface of the exposed end part of the input member 600, the outside surface 730 supported by an inner circumference side of the through hole 410 of the second flange 400, and the supporter 720 connecting the inside surface 710 and the outside surface 730 and supporting the exposed upper surface of the control part 300.

Due to this configuration of the insert part 700, by supporting the upper surface of the control part 300, assembly performance of the seat recliner is improved compared to than a configuration of a conventional cap, and coupling strength of the seat recliner is improved. In addition, by using a simple shape of the insert part 700, manufacturing cost is reduced compared to using the conventional cap formed by injection molding.

The inside surface 710 locked to the outer circumferential surface of the exposed end part of the input member 600 may have a cone shape inclined to the upper part of the second flange 400 so that the inside surface 710 is tapered in an inside direction of the through hole 410. That is, the inside surface 710 is further extended upward in a direction of an end of the inside surface 710 locked to the outer circumferential surface of the exposed end part of the input member 600, so that the inside surface 710 may have the cone shape inclined obliquely inward and upward.

The insert part 700 may be made of a metal material by the press method. Thus, the insert part 700 has elasticity, so it may be partially deformed, and may maintain elastic force depending on the deformation. In addition, the insert part 700 is not damaged even if it is subjected to coupling process by heat such as welding, so that durability thereof can be can maintained.

Especially, the inside surface 710 of the insert part 700 may be configured such that an inner circumference of an upper end thereof is formed larger than an outer circumference of the outer circumferential surface of the input member 600, thus the insert part 700 may be forcibly fitted around the input member 600. That is, since an inner circumferential surface defined by the inside surface 710 of the insert part 700 is shaped into a circular shape smaller than the outer circumferential surface of the input member 600, the inside surface 710 of the insert part 700 is deformed outward, thus the insert part 700 may be forcibly fitted around the input member 600.

Meanwhile, the inside surface 710 of the insert part 700 is extended so that a plane distance from an end of the supporter 720 connected to the outside surface 730 to the upper end of the inside surface 710 is provided larger than a plane distance from an inner circumference of the second flange 400 to the outer circumferential surface of the input member 600. Thus the insert part 700 may be coupled to the input member 600 by being forcibly fitted around the input member 600. That is, as the inside surface 710 of the insert part 700 is compressed outward, the supporter 720 and the outside surface 730 connected to the supporter 720 may be also compressed outward, i.e., toward an inner circumference of the through hole 410 of the second flange 400.

Therefore, the insert part 700 may be compressed toward the inner circumference of the through hole 410 in the through hole 410 of the second flange 400 as the insert part 700 is fitted around the outer circumferential surface of the input member 600. In addition, the insert part 700 may compress the upper surface of the control part 300 by the elastic force generated due to the deformation of closing the insert part downward. Accordingly, the coupling strength can be improved.

The inside surface 710 of the insert part 700 is provided with a plurality of slits 711 formed from an inside end to a side of the supporter 720 (e.g., slits formed along a radial direction of the insert part 700) so that the inside surface 710 may be divided into a plurality of parts. Since the insert part 700 is formed of a metal plane plate by the press method, the inside surface 710 may have the plurality of slits 711 penetrating the metal plane plate from the inside end to the side of the supporter 720 during a first processing of the press method, and the inside surface 710 may be divided into the plurality of parts by the plurality of slits 711. In addition, the inside surface 710 divided into the plurality of parts may be shaped into the cone shape inclined toward the upper part of the second flange 400 to be tapered in the inside direction of the through hole 410, during a second processing of the press method.

Accordingly, even if the inside surface 710 of the insert part 700 is deformed into the cone shape inclined toward the upper part of the second flange 400, the inside surface 710 is tapered in the inside direction of the through hole 410, thus the inside surface 710 is not damaged, for example, torn or destroyed.

The outside surface 730 of the insert part 700 may have a flange shape configured such that an upper end thereof is bent out of the through hole 410 at the upper end of the inner circumferential surface of the through hole 410 provided at the second flange 400. That is, the bent upper end of the outside surface 730 may be placed on the upper part of the second flange 400. The upper end of the outside surface 730 placed on the upper part of the second flange 400 may be provided in parallel with the upper part of the second flange 400 and may be in surface contact with the second flange 400.

Thus, as the insert part 700 is supported by the upper surface of the second flange 400 and is guided into the through hole 410 of the second flange 400, coupling performance of the seat recliner can be improved.

The supporter 720 of the insert part 700 may be a plane plate having a ring shape and may be in contact with the upper surface of the control part 300 exposed to the outside through the through hole 410. Especially, the supporter 720 of the insert part 700 may be in surface contact with the upper surface of the control part 300 while being in close contact with the upper surface of the control part 300.

That is, when the insert part 700 is inserted into the through hole while being deformed, the supporter 720 connecting between the inside surface 710 and the outside surface 730 of the insert part 700 has elasticity acting downward, thus it is in close contact with the exposed central upper surface of the control part 300. The supporter 720 of the insert part 700 is provided as a plane plate parallel with the upper surface of the control part 300, so the supporter 720 may be in surface contact with the upper surface of the control part 300.

Figure 6:
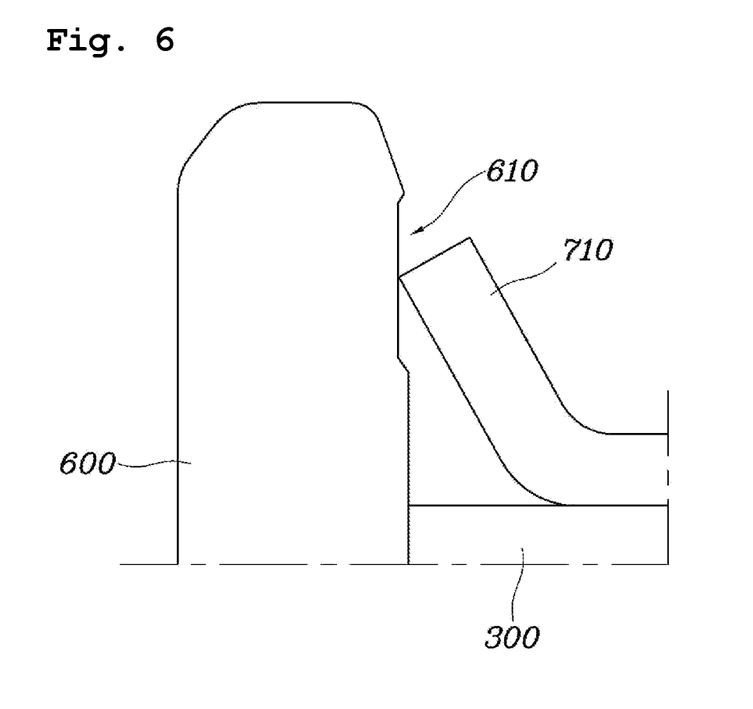
FIGS. 6 and 7 are cross-sectional views showing an input member according to exemplary forms of the present disclosure.
Figure 7:
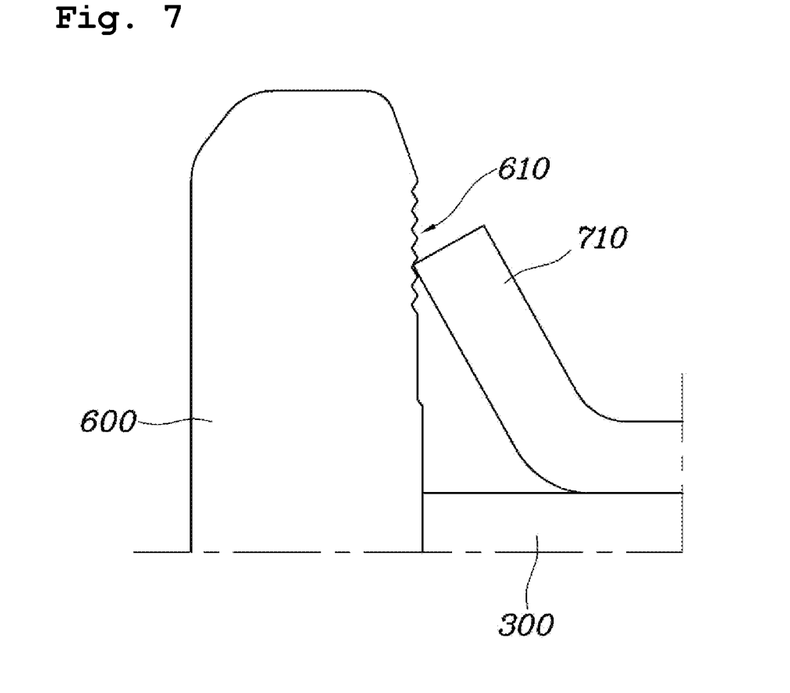

FIGS. 6 and 7 are cross-sectional views showing the input member 600 according to forms of the present disclosure.

Referring to FIG. 6, a stopping step 610 for being locked to the insert part 700 may be provided on the outer circumferential surface of the input member 600, so that the end of the inside surface 710 of the insert part 700 is inhibited or prevented from being separated from the input member 600.

As the insert part 700 is partially deformed so as to be tapered in a direction of the upper part of the through hole 410, the insert part 700 may have the elasticity in directions of opening to the inside of the input member 600 and the outside of the through hole 410. Thus, the insert part 700 is compressed downward of the through hole 410 and is not removed out of the through hole 410.

However, the stopping step 610 may be further provided so that the end of the inside surface 710 of the insert part 700 is locked to the outer circumferential surface of the input member 600. The stopping step 610 may be provided at the outer circumferential surface of the input member 600 where the end of the inside surface 710 of the insert part 700 is located while being in an inserted state. The stopping step 610 may be configured such that the outer circumferential surface of the input member 600 is partially cut inward, or the stopping step 610 protrudes simply at the upper part of the outer circumferential surface of the input member 600 where the end of the inside surface 710 of the insert part 700 is located. By preventing the insert part 700 from removing from the input member, strong coupling force can be maintained.

Referring to FIG. 7 as another form, a plurality of the stopping steps 610 may be provided on the outer circumferential surface of the input member 600 along a central axis direction of the input member 600 side by side. Accordingly, a worker can easily adjust positions of coupling and assembly between the input member 600 and the insert part 700, and can firmly couple the input member 600 and the insert part 700. That is, even if the insert part 700 is removed from any one of the stopping steps 610, the insert part 700 may be locked to the other stopping step 610 again, and the insert part 700 is inhibited or prevented from being removed, so that stronger coupling force can be realized.

Although exemplary forms of the present disclosure have been described for illustrative purposes, those skilled in the art will appreciate that various modifications, additions and substitutions are possible, without departing from the scope and spirit of the present disclosure.

What is claimed is:

1. A seat recliner for a vehicle, the seat recliner comprising:
   a first flange on which a lock cam is seated at a center part thereof to be rotatable;
   a plurality of lock gears radially disposed around the lock cam;
   a control part disposed on upper parts of the plurality of lock gears, and an upper part of the lock cam, the control part configured to guide lock gears of the plurality of lock gears so that the lock gears slide inward and outward;
   a second flange covering the control part and coupled to be rotatable relative to the first flange, and provided with a through hole at a center part thereof to expose a center part of the control part to outside;
   an input member extended along a central axis of each of the first flange and the second flange, and configured to penetrate through the first flange, the lock cam, the control part, and the second flange in order, wherein an end part of the input member is exposed to outside of the second flange; and
   an insert part inserted in the through hole of the second flange, the insert part including:
      an inside surface locked to an outer circumferential surface of the exposed end part of the input member,
      an outside surface supported by an inner circumferential surface of the second flange which defines the through hole, and
      a supporter configured to connect the inside surface and the outside surface of the insert part, and configured to support an exposed upper surface of the control part,
   wherein the inside surface of the insert part is provided with a plurality of slits formed along a radial direction of the insert part, such that the inside surface is divided into a plurality of parts.

2. The seat recliner for the vehicle of claim 1, wherein the inside surface of the insert part has a cone shape inclined toward an upper side of the second flange to be tapered in an inside direction of the through hole of second flange.

3. The seat recliner for the vehicle of claim 2, wherein an upper end of the inside surface of the insert part has an inner diameter provided larger than an outer diameter of the outer circumferential surface of the input member, so the insert part is forcibly fitted around the input member.

4. The seat recliner for the vehicle of claim 2, wherein the inside surface of the insert part is extended so that a plane distance from an end of the supporter connected to the outside surface to an upper end of the inside surface is larger than a plane distance from the inner circumferential surface of the second flange to the outer circumferential surface of the input member, so the insert part is forcibly fitted around the input member.

5. The seat recliner for the vehicle of claim 1, wherein the outside surface of the insert part has a flange shape configured such that an upper end of the outside surface is bent out of the through hole on an upper end of the inner circumferential surface of the second flange.

6. The seat recliner for the vehicle of claim 1, wherein the supporter of the insert part is a ring shape plate and is placed on the upper surface of the control part exposed to outside through the through hole.

7. The seat recliner for the vehicle of claim 6, wherein the supporter of the insert part is in close contact with the upper surface of the control part.

8. The seat recliner for the vehicle of claim 1, wherein the outer circumferential surface of the input member has a stopping step for being locked to the insert part so that an end of the inside surface of the insert part is inhibited from being separated from the input member.

9. The seat recliner for the vehicle of claim 8, wherein a plurality of stopping steps provided on the outer circumferential surface of the input member is disposed along a central axis of the input member.

* * * * *